Figure 1:
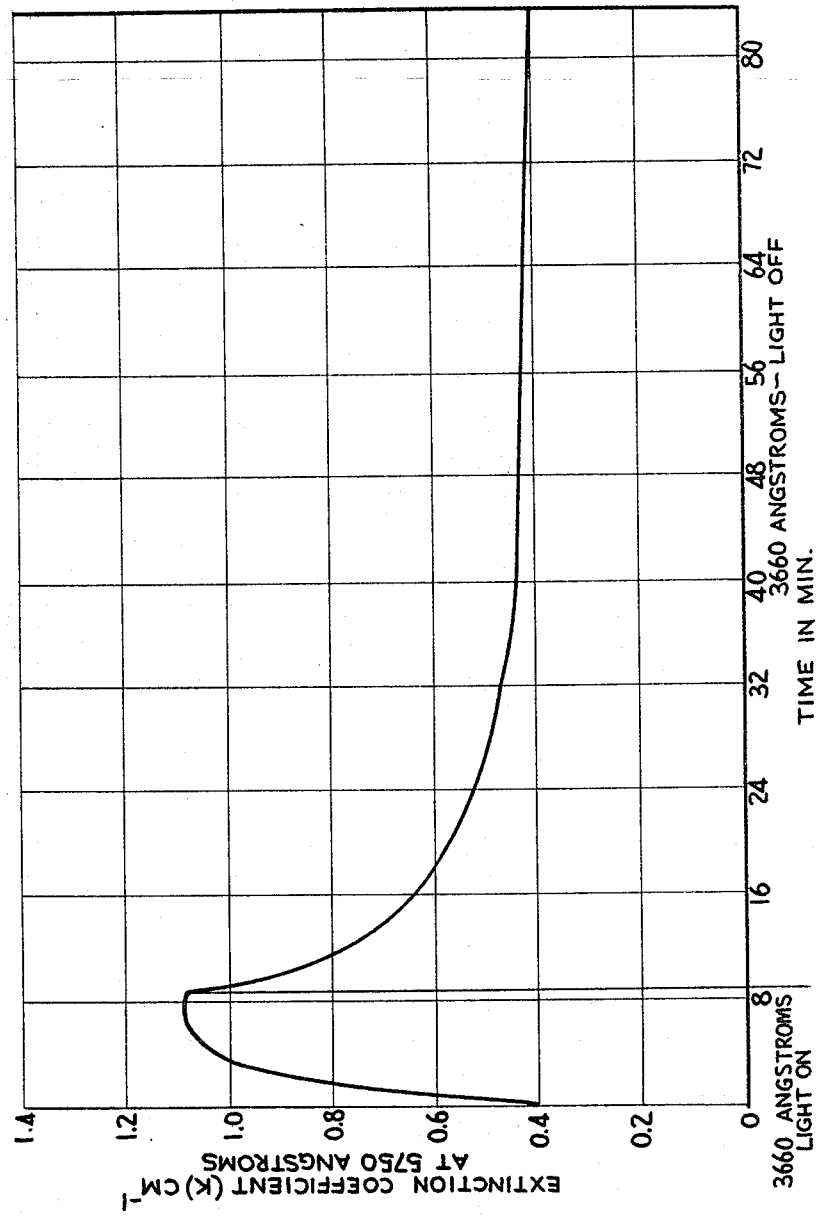

3,278,319
PHOTOTROPIC GLASS AND METHOD
Alvin J. Cohen, Pittsburgh, Pa., assignor to Pittsburgh Plate Glass Company, Pittsburgh, Pa., a corporation of Pennsylvania
Filed Aug. 6, 1962, Ser. No. 215,139
5 Claims. (Cl. 106—52)

The present invention relates to phototropic glass compositions and to processes for manufacturing phototropic glasses. The invention particularly relates to glasses which exhibit phototropic behavior when irradiated with ultraviolet radiation and to articles of manufacture made from the phototropic glasses.

A phototropic glass is one which has the ability to color when irradiated with light in a particular wavelength region and whose color fades when the exciting radiation is removed.

The phototropic glasses prepared according to the teachings of the present specification will have many uses related to the research and exploration of space. It is known that when man and his instruments are removed from the protective layers of the earth's atmosphere upon entering space, they will be subjected to very deep ultraviolet radiation. The purpose of the present invention is to provide a glass which will tint in response to the ultraviolet radiation present in space as well as color in terrestrial sunlight. The automatic tinting of this glass will protect man's vision and his phototropic equipment from the visible radiation so that man and his equipment will be more useful for space observation.

A phototropic glass will also have many practical uses in our present society. Phototropic glass can be incorporated into ordinary prescription eye glasses which automatically become sunglasses when the wearer goes outdoors; into automobile windshields which darken and fade in response to sunlight; into camera lenses which regulate the amount of light allowed to reach the film; into building construction which automatically regulates the amount of light allowed to penetrate the building's interior to keep the building cool in summer and warm in the winter; into calibrated glass dosimeters which yield an almost instantaneous reading of the ultraviolet and higher energy radiation striking the glass; and into windows in the home that act as automatic curtains or blinds. These few examples indicate the present invention's usefulness.

It has been discovered that a phototropic glass composition can be prepared by incorporating cerium into the glass and preparing the glass under strong reducing conditions. Preparation under such reducing conditions favors the development of cerous ($Ce^{+3}$) ion in the glass which exhibits a strong absorption band in the ultraviolet range centered at 3140 angstroms. Reducing conditions during the preparation of the glass also favor the development of glass structural environments which can develop metastable color centers of the type which exhibit an absorption band centered at about 5750 angstroms in the visible range. The glasses can contain up to about 25 percent by weight or more of cerium in the proper state based upon the weight of the phototropic glass.

It is theorized that when cerous ion ($Ce^{+3}$) absorbs ultraviolet radiation in the range of 3140 angstroms or sunlight in the long wavelength tail of the cerous band, an electron from one of the cerous ions outer electron shells is raised to an excited energy level. This excited electron is displaced from the cerous ion and becomes trapped in a nearby incipient color center trapping site. The trapping site is some unknown environment which exists in the glass structure and which is physically close to the cerous ion and which only exists in glasses prepared under strong reducing conditions. The displaced electron upon being trapped in the trapping environment produces a color center in the glass. It is this color center, which has the ability to absorb visible light in a band centered at about 5750 angstroms in visible spectrum, which produces a characteristic amethyst color in the glass. The color thus produced is unstable and spontaneously decays or fades soon after it has been produced.

Whenever sunlight or ultraviolet radiation strikes glass prepared in accordance with the present invention, color centers are produced in the glass. These color centers continuously decay once they are formed, but the rate of their decay is somewhat slower than that of their formation. The result is, therefore, that the glass colors as it is irradiated until a saturation level is reached. The saturation level is dependent upon the intensity of the exciting ultraviolet radiation and the number of glass structure environments that exist in the glass which can form color centers of the type that exhibit the characteristic 5750 angstrom absorption band. The saturation level is reached when the rate of color center formation equals the rate of color center decay. The glass fades when the exciting radiation is removed because no new color centers are being formed while the already formed color centers are continuously spontaneously decaying.

The decay of a color center is the result of the trapped electron being released by the trapping environment and traveling to some other place in the glass structure. Most often the released electron finds its way back to a cerous ion which had previously lost an electron by absorbing a part of the exciting ultraviolet radiation.

Because metastable color centers are created when the cerous ion absorbs ultraviolet radiation and the color center formed spontaneously decays, the glass colors and fades in response to the amount of ultraviolet radiation which strikes the cerous ion containing glass. Glasses prepared according to the present invention can be colored and faded repeatedly.

If a glass is prepared under inadequate reducing conditions, an insufficient number of structural environments are produced which have the ability to form the characteristic 5750 angstrom absorbing color centers. Therefore, glasses prepared under oxidizing conditions or only slightly reducing conditions, even though they contain the cerous ion, do not exhibit phototropic behavior.

The essential characteristics of an element which induces phototropic behavior in glass are:

(1) that the element have an absorption band in the ultraviolet region which is reasonably close to the visible range. The closer to the visible range the ultra-violet absorption band is, the more easily the glass can utilize the wavelengths of lower energy (sunlight) to sensitize the glass;

(2) the element must be able to be incorporated into a glass which is prepared under reducing conditions; and (3) the element must have an electronic configuration which enables an electron from one of its energy levels to be excited by absorbing ultraviolet radiation and be released in such a way that it is capable of being trapped in an incipient color center trapping site in the glass.

Base glass compositions that can be used to prepare phototropic glasses include soda-silica compositions and soda-lime-silica compositions such as are conventionally used in the manufacture of window and plate glass. The reduced base glasses can contain the following ingredients in percent by weight: 45 to 80 percent $SiO_2$, 10 to 50 percent of alkali metal oxides including 10 to 50 percent $Na_2O$ and 0 to 10 percent $K_2O$, 0 to 30 percent of alkaline earth metal oxides including 0 to 20 percent CaO, and 0 to 10 percent MgO and 0 to 5 percent $Al_2O_3$, as well as amounts of other glass making ingredients such as BaO, PbO, ZnO, SrO, $B_2O_3$, $HfO_2$ and $ZrO_2$ and fluorine which do not adversely affect the phototropic effects of the glass while imparting other desirable properties to the glass, such as the desired coefficient of thermal expansion, index of refraction, softening point, strain point, liquidus temperature, devitrification rate, melting rate, etc. Typical soda-lime-silica base glasses contain by weight 60 to 75 percent $SiO_2$, 10 to 20 percent $Na_2O$, 0 to 10 percent $K_2O$, with the total alkali metal oxide content being 10 to 21 percent, 5 to 16 percent CaO, 0 to 10 percent MgO, with the total alkaline earth metal oxide content being 5 to 18 percent, and 0 to 5 percent $Al_2O_3$.

The invention is described with reference to an absorption band centered at about 5750 angstroms. It is to be understood that this band may be shifted slightly depending upon the base ingredients in the glass, i.e., the acidity of the glass.

It is necessary to prepare the base glasses from raw materials of high purity because many of the elements normally present as impurities in the raw materials for glass preparation inhibit phototropic behavior. It has been discovered that iron, vanadium, tantalum and titanium present in the glass in small amounts tend to inhibit phototropic behavior. Elements such as hafnium and zirconium, on the other hand, have the beneficial effect of enhancing the intensity of the color induced in the glass. Other poisoning agents and color enhancing agents which are unknown at the present time undoubtedly also exist.

Pure soda-silica and soda-lime-silica glass compositions, if prepared under strong reducing conditions, have the ability to develop the color centers of the type which have the broad absorption band centered at 5750 angstroms. The ability to develop this type of incipient color center environment is independent of the presence of cerium; however, cerium has the ability to induce the color center development rapidly in the glass and also promote the rapid fading of the color centers once they are produced.

It has been found there is a direct correlation between the energy necessary to form the color centers and their stability. The higher the exciting energy necessary to induce the color center at 5750 angstroms, the more permanent and non-fading is the color center produced. To produce a fast coloring and fast fading type of phototropic glass, the activating element should have the property of having an absorption band in the ultraviolet region which is as near as possible to the visible spectrum. This is because the closer to the visible range the absorption band in the ultraviolet region is, the lower is the energy of the exciting radiation necessary to sensitize the glass.

Glasses prepared under strong reducing conditions have been observed to transmit higher percentages of incident ultraviolet radiation than do glasses of similar compositions prepared under oxidizing conditons. It is believed that because the higher oxidation states of impurities such as titanium and iron have very high absorption bands in the ultraviolet range, the presence of these species or similar species in a glass accounts for the high absorption of the incident ultraviolet radiation by the glass. In a glass prepared under reducing conditions, the species $titanium^{+3}$ and $iron^{+2}$ are developed. These species have much lower absorption in the ultraviolet range and this accounts for the fact that these glasses transmit a much higher percentage of the incident ultraviolet radiation.

Glasses prepared according to the present invention are substantially colorless as melted. Upon being irradiated with an ultraviolet light source up to wavelengths of about 3660 angstroms, the glasss color amethyst to a near saturation level in about 4 minutes or less, with a noticeable amethyst color developing upon 5 to 15 seconds irradiation. The color exhibited by the glass when irradiated with ultraviolet radiation is amethyst due to the glass' metastable color center absorbing light in a band centered at about 5750 angstroms in the visible range.

Removal of the exciting ultraviolet radiation allows the metastable color centers to decay and the amethyst color to fade. The extinction coefficient of the absorption in the glass at 5750 angstroms drops rapidly, with little color being noticeable ten minutes after the exciting radiation is removed.

The extinction coefficient is a measure of a material's ability to absorb light. The extinction coefficient (K) is a number obtained by dividing the optical density (O.D.) by the sample thickness in centimeters. The extinction coefficient (K) therefore has the unit of $cm.^{-1}$.

$$K = O.D./\text{thickness in cm.}$$

Optical density is the logarithm to the base 10 or the reciprocal of the transmittance (T) or $$O.D. = \log \frac{1}{T}$$

The transmittance (T) is the fraction of the incident light that is transmitted or passes through the glass sample. The transmittance is found by dividing the amount of light transmitted by the amount of light that enters the sample.

$$T = \frac{\text{light transmitted}}{\text{incident light}}$$

If a glass sample transmits 25 percent of the incident light of a given wavelength and it is 3 millimeters thick, the extinction coefficient (K) is found by the following calculation:

$$O.D. = \log \frac{1}{T} = \log \frac{1}{.25} = \log 4 = 0.602$$

$$K = \frac{O.D.}{\text{thickness in cm.}} = \frac{0.602}{.30} = 2.007 \text{ cm.}^{-1}$$

$K = 2.007$ cm.$^{-1}$

It should be noted that from the nature of the extinction coefficient measurement difficulty in comparing various phototropic glass samples may be encountered. Two glass samples upon being tested may yield the same numerical value for their respective extinction coefficients and vary greatly in their ability to color. The value given for the extinction coefficient of a glass sample alone cannot reveal whether the sample colored very intensely at its surface and very slightly the rest of the way through its thickness or whether the glass sample colored essentially uniformly throughout its thickness. It should be appreciated that a glass which has the ability to color very intensely at its surface will absorb a great deal of the exciting ultraviolet radiation at that point and thereby prevent the exciting radiation from penetrating its interior to cause further coloration of the sample. On the other hand, if a glass sample which has the ability to color, can color uniformly throughout its thickness, it will still yield a high extinction coefficient measurement.

To compare adequately and precisely the colorability of two phototropic glass samples, therefore, the extinction coefficient alone is not the only factor to consider. Care must be taken to also account for the thickness or relative thicknesses of the glass samples being compared. The only time the straight comparisons of extinction coefficients will be completely accurate will be in the case where the two glass samples are very thin and nearly all of the exciting ultraviolet radiation is either transmitted or uniformly absorbed in the tested thickness of the glass sample.

Phototropic glasses prepared according to the present invention have the property of fatiguing upon prolonged or repeated exposure to exciting ultraviolet radiation. Fatigue is a phenomenon wherein the glass upon being repeatedly or overly exposed to ultraviolet radiation does not color to the same extent and intensity as it did upon the initial exposure to ultraviolet radiation. It is theorized that the fatigue phenomenon is the result of the cerous ion being altered by the ultraviolet exciting radiation in such a way so as to change its ability to release the electron necessary to produce the 5750 Angstrom color center in the glass structure. It is also theorized that part of the fatigue phenomenon is due to the presence of phototropic inhibitors such as iron and titanium which compete with the necessary cerous ion by occupying those places or sites in the glass structure which are close to the defect environments which can develop into the 5750 Angstrom color center.

The impurities, such as iron and titanium, which may be present in the glass also may compete with the cerous ion for the electron released when the color center decays. This competition prevents the released electron from returning to a cerous ion that has lost its excited electron thereby preventing the re-release of this electron to be subsequently retrapped to produce another color center.

The fatiguing of a phototropic glass prepared according to the present invention is rapid initially but gradually decreases over the period of exposure time until it reaches a relatively stable level. After a phototropic glass has been bleached by a long cumulative exposure to ultraviolet radiation, a point is reached, after which the fatigue rate becomes very small with respect to time.

Figure 2:
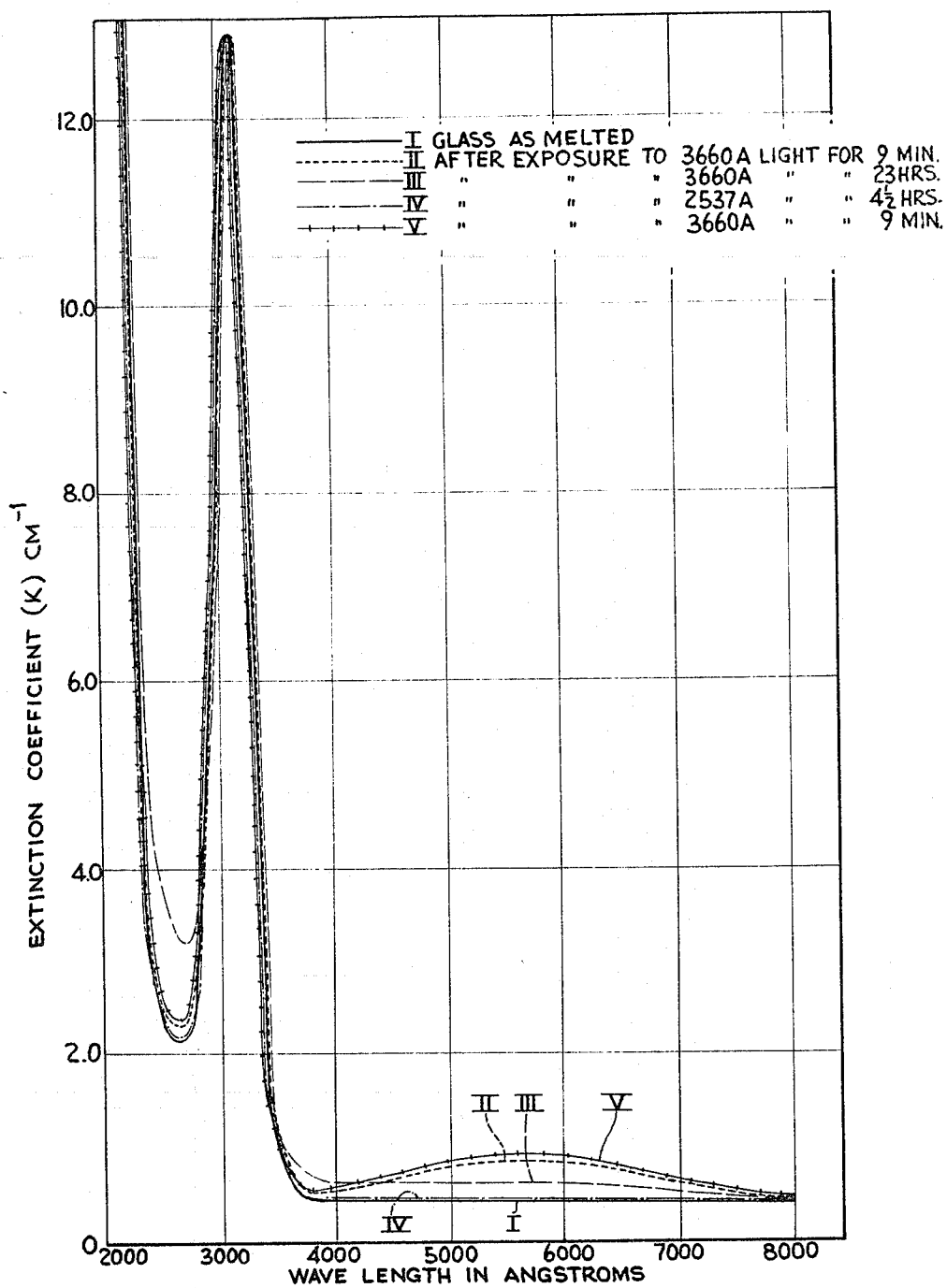

FIG. 2 of the drawings shows the optical absorption curves of a glass prepared according to the present invention illustrating the absorption of ultraviolet radiation by a cerous ion and the absorption in the visible spectrum at 5750 angstroms by a color center which colors the glass amethyst.

EXAMPLE

Cerium-containing phototropic glasses are prepared by mixing and melting the following batch ingredients:
 (1) Fused silica (Reagent grade).
 (2) Sodium carbonate monohydrate (Electronic grade).
 (3) Cerium dioxide (High purity grade).

In the preparation of each glass, 7.95 parts by weight of fused silica and 8.2 parts by weight of sodium carbonate monohydrate is used. The amount of cerium dioxide batch ingredient is varied in each sample to obtain phototropic glasses. The following maximum extinction coefficients, K, (centimeters$^{-1}$) at about 5750 angstroms were obtained by exposing the samples, having the thicknesses indicated to 3660 angstrom light for the stated period of time.

| Glass No | 1 | 2 | 3 | 4 | 5 | 6 | 7 | 8 | 9 | 10 | 11 |
|---|---|---|---|---|---|---|---|---|---|---|---|
| Cerium dioxide (parts by weight) | .00146 | .0073 | .0146 | .0292 | .0730 | .146 | .730 | 1.46 | 2.92 | 4.38 | 5.11 |
| Extinction Coefficient, K, cm.$^{-1}$ | .21 | .51 | .51 | .61 | .26 | .59 | .76 | .54 | .40 | .38 | .08 |
| Thickness (millimeters) | 1.86 | 1.56 | 1.76 | 1.16 | 2.02 | 1.19 | 1.43 | 1.91 | 1.76 | 1.01 | 2.14 |
| Time of exposure to 3,660 angstrom light (minutes) | 6 | 7 | 7 | 5 | 7 | 5 | 9 | 12 | 11 | 9 | 8 |

It has been discovered that a fatigued phototropic glass can be resensitized by irradiating the fatigued glass with deep ultraviolet radiation, such as 2537 Angstroms. The resensitizing phenomenon is not understood at the present time, but is thought that the higher energy ultraviolet radiation tends to restore the amount of cerous ion to its initial concentration, thereby rendering the glass essentially the same as it was initially prepared. In any event, the fatigued glass can be repeatedly fatigued and resensitized to its original phototropic sensitivity and in some cases even beyond its initial sensitivity by irradiation with very deep ultraviolet light. Resensitization is more effective in glasses having lower concentrations of cerium. High cerium concentrations in the glasses produce high absorption in the ultraviolet region and reduce the penetration of the resensitizing radiation into the glass. Lower concentrations of cerium in the glasses are therefore preferable.

The invention is further explained by the following example and drawings:

FIG. 1 of the drawings is a graph containing an optical absorption curve which illustrates the phototropicity of the reduced, cerium-containing glass. The curve is a plot of the extinction coefficient of the glass at 5750 angstroms versus time as the glass is first exposed to 3660 angstrom light and the light is then removed. It can be seen that the extinction coefficient of the glass at 5750 angstroms increases rapidly as the glass is exposed to 3660 angstrom light. As the time of exposure continues, the maximum value for the extinction coefficient is approached and the curve levels off. Thus, the point at which the rate of formation and the rate of decay of the color centers which absorb light at about 5750 angstroms reaches equilibrium. The glass is colored amethyst as a result of the exposure to the 3660 angstrom light.

After 9 minutes, the 3660 angstrom light source is removed. The second portion of the curve in FIG. 1 illustrates the decay of the color centers and fading of the amethyst color in the glass with time after removal of the 3660 angstrom light. The slope of the curve representing the extinction coefficient is quite steep at first and it gradually decreases. Ten minute after the light is removed, the amethyst color is virtually gone.

The fused silica is prepared by grinding about 10 grams of fused silica to a fine powder in a boron carbide mortar and pestle. The crushed silica is then placed in a 400 cubic centimeter Pyrex breaker and washed in aqua regia three times. The aqua regio solution is prepared from full strength hydrochloric acid (36.5 to 38.0 percent acid, specific gravity 1.185 to 1.192), and full strength nitric acid (70–71 percent acid, specific gravity 1.42). The aqua regia solution is made by mixing 75 cubic centimeters of full strength hydrochloric acid and 75 cubic centimeters of full strength nitric acid. The fused silica is washed by adding 50 cubic centimeters of the aqua regia solution to the 400 cubic centimeter Pyrex beaker and stirring the solution and fused silica with a Pyrex stirring rod. After each washing, the aqua regia is poured off. The fused silica is next washed with the same full strength hydrochloric acid used to make the aqua regia solution until the wash solution does not turn yellow. Each wash with hydrochloric acid uses about 50 cubic centimeters of the full strength acid solution. The fused silica is then washed with deionized water until the acid is removed. The washed fused silica is dried in an oven overnight at about 100° C. After drying the fused silica is cooled by standing in air and about 7.95 grams are weighed to be used in the glass batch.

An emission analysis of the prepared fused silica disclosed the following impurities:

$SiO_2$ analysis

| Impurity: | Amount (percent by weight) |
|---|---|
| Boron | Trace |
| Calcium | Trace |
| Aluminum | 0.0001 |
| Iron | 0.0001 |
| Magnesium | 0.001 |

The boron impurity is introduced by the grinding operation in the boron carbide mortar.

The sodium carbonate monohydrate is used; and while anhydrous $Na_2CO_3$ is equally suitable the hydrated salt is more readily obtained. $Na_2CO_3 \cdot H_2O$ is satisfactory because the water of hydration is automatically removed during the heating procedure in the preparation of the glass. The water removal is enhanced by the reducing conditions present in accordance with the following equations.

(1)
$$2C\text{(graphite)} + O_2\text{(air)} \xrightarrow{\text{heat}} 2CO$$

(2)
$$Na_2CO_3 \cdot H_2O + CO \xrightarrow{\text{heat}} Na_2O + 2CO_2\uparrow + H_2\uparrow$$

Water in any other batch ingredients is removed by similar reactions.

It is necessary that water be absent from the glass as prepared in order to insure that the characteristic color centers develop in the glass.

The analysis of $Na_2CO_3 \cdot H_2O$ reveals the following impurity contents:

$Na_2CO_3 \cdot H_2O$ *analysis*

| Impurity: | Amount (percent by weight) |
|---|---|
| Insoluble material | 0.005 |
| Chloride | 0.003 |
| Nitrogen compounds | 0.0005 |
| Phosphate | 0.0005 |
| Sulfur compounds | 0.003 |
| $NH_4OH$ precipitate | 0.010 |
| Arsenic | 0.00005 |
| Ca+Mg precipitate | 0.005 |
| Heavy metals (as Pb) | 0.0001 |
| Iron | 0.0005 |
| Potassium | 0.02 |
| Silica ($SiO_2$) | 0.005 |

The powdered fused silica, $Na_2CO_3 \cdot H_2O$ and high purity cerium dioxide are thoroughly mixed together by shaking in a new, unused stoppered polyethylene container and then transferred to a graphite melting crucible. The crucible is a right cylinder of graphite 2 inches high and 2 inches in diameter with a cavity 1 inch deep by 1 inch in diameter bored in it. Spectrographic analysis disclosed that the crucible contained the following ingredients as impurities:

| Impurity: | Concentration, parts per million |
|---|---|
| Calcium | 3 |
| Magnesium | 1 |
| Silica | 6 |

The crucible and batch materials are then placed in the work coil of a high frequency induction furnace and heated slowly to between 850° C. and 900° C. in the open air to remove the moisture from the batch. The temperature is held between 850° C. and 900° C. for a period of 10 to 15 minutes during which most of the $Na_2CO_3$ decomposes to $Na_2O$ and $CO_2$. After the $Na_2CO_3$ has been largely decomposed, the induction furnace is shut off and a graphite lid with a small hole in it is placed on the graphite crucible. The induction furnace is again turned on and the covered crucible containing the glass batch is heated to a temperature of about 1600° C. and held there for about an hour. The time required to reach 1600° C. is of the order of 15 to 20 minutes. After an hour of melting, the glass will be reasonably fined and of good optical quality. The induction coil furnace is then shut off.

The purpose of the lid on the graphite crucible is to insure that the glass is being prepared under intense reducing conditions. The lid keeps oxygen from the atmosphere from reaching the glass batch and the hole in the lid provides an escape for any carbon dioxide gas that evolves from the decomposition of any residual sodium carbonate that may still be present in the batch.

The covered graphite crucible is removed from the induction coil furnace and allowed to cool to room temperature by standing in air. The glasses that are produced weigh respectively about 11.4, 11.4, 11.4, 11.4, 11.5, 11.6, 12.1, 12.8, 14.2, 15.6 and 16.3 grams and are easily removed from the graphite crucible because the glasses do not wet the crucible. The glasses produced according to this procedure exhibit phototropic behavior when the above described reducing conditions are employed during their preparation. The glasses analyse as sodium silicate glasses ($Na_2O \cdot 2.5SiO_2$) containing respectively 0.012, 0.061, 0.12, 0.24, 0.6, 1.2, 5.7, 10.9, 19.5, 27.0 and 30.0 percent weight of cerous oxide ($Ce_2O_3$) based upon the weight of the glass.

The prepared glasses upon being irradiated with ultraviolet light of 3660 Angstroms color amethyst. One millimeter thick plates of these glasses develop the ability to absorb up to about 15 percent of incident 5750 angstrom radiation. The ability to absorb 5750 angstrom light reaches a maxium in about 5 minutes when irradiated with 3660 Angstrom ultraviolet radiation. The glasses begin to fade immediately after the exciting ultraviolet light is removed and return to substantially their original condition in about 10 minutes.

The figures show the phototropicity and light absorption characteristics of the soda-silica-cerous oxide glass sample No. 3 prepared as described above in the example. The sample was ground and polished on both sides to a thickness of 0.96 millimeter and then exposed to various wavelengths of light for various lengths of time.

Curve I of FIG. 2 of the drawing shows the absorption characteristics of the glass as melted. Curve II of FIG. 2 of the drawings shows the absorption characteristics after 9 minutes of exposure to 3660 angstrom light. Curve II shows the broad absorption band centered at about 5750 Angstroms which is responsible for the phototropic behavior or variation in transmission of visible light exhibited by this type of glass. The absorption band's magnitude pictured in Curve II is not the maximum coloration observed during exposure to 3660 Angstrom light because the absorption band spontaneously fades while being formed and about 40 seconds were necessary to record the absorption spectrum shown. After removal of the glass from exposure to the 3660 Angstrom light, the color in the glass faded and the absorption curve of the glass after fading is substantially the same as Curve I of FIG. 2.

Curve III of FIG. 2 shows the absorption band centered at 5750 Angstroms after the glass sample is exposed to 3660 Angstrom light for 23 hours. This curve indicates the fatigue phenomenon. It is theorized that the fatigue effect is the result of the cerium ion being altered when it absorbs the exciting ultraviolet radiation, presumably by photo-oxidation, to form ceric ion which will not impart the desired phototropic properties to the incipient color center in the glass. The increased light absorption below 2700 Angstroms is presumably due to the ceric ion produced by the photo-oxidation just mentioned. It can be noticed from Curve III that after 23 hours' exposure to 3660 Angstrom light, the glass exhibits a less intense absorption band centered at 5750 Angstroms than shown in Curve II.

Curve IV of the figure shows the absorption characteristics of the fatigued glass as treated above after it has been further exposed to 2537 Angstrom light for 4½ hours.

Curve V of the figure illustrates the absorption characteristics of the glass as treated above to "fatigue" it and then renew its phototropic effects. When the renewed glass is irradiated with 3660 Angstrom light for 9 minutes, as was done to obtain the colored glass for Curve II, the glass is again colored amethyst. This is illustrated by the absorption band centered at about 5750 Angstroms in Curve V. It can be seen, therefore, that the fatigue effect shown in Curve III can be overcome and the phototropic effects of the glass renewed by exposure of the glass to 2537 Angstrom light.

Almost any reduced silicate glass composition can produce a phototropic glass provided:
 (1) the proper amount of cerium is added to the batch;
 (2) the cerium and glass are properly reduced; and
 (3) the raw materials and final reduced glass do not contain amounts of transition elements and other poisoning elements which inhibit the phototropic effect.

The invention is not limited to the embodiment which has been described by way of example, and it would not be a departure from its scope to incorporate modifications, either as regards the composition of the base glass or the procedure used to prepare the reduced glass. Any method in which cerium is incorporated into a base glass composition as the agent that develops phototropic behavior of the resultant glass will not be a departure from the invention.

I claim:

1. A strongly reduced phototropic glass composition consisting essentially of a glass base composition selected from the group consisting of soda-silica and soda-lime-silica glass compositions of high purity containing cerium in the form of cerous ($Ce^{+3}$) ion in an amount up to 25 percent by weight based on the weight of said glass base composition and which contains a substantial quantity of incipient metastable color centers which exhibit an absorption band at about 5750 Angstroms in the visible range.

2. A phototropic glass article which comprises a base glass composition selected from the group consisting of soda-silica and soda-lime-silica glass compositions of high purity containing cerium in the form of cerous ($Ce^{+3}$) ion in an amount up to 25 percent by weight based on the weight of said glass base composition, which colors when irradiated with ultraviolet radiation and in which said color fades when the ultraviolet radiation is removed due to the presence of a substantial quantity of ultraviolet light sensitive incipient metastable color centers and which is substantially free of impurity metals selected from the group consisting of iron, vanadium, tantalum, titanium and mixtures thereof.

3. A phototropic glass article which comprises a base glass composition selected from the group consisting of soda-silica and soda-lime-silica glass compositions of high purity containing cerium in the form of cerous ($Ce^{+3}$) ion in an amount up to 25 percent by weight based on the weight of said glass base composition, which colors when irradiated with ultraviolet radiation and in which said color fades when the ultraviolet radiation is removed, which contain a substantial quantity of incipient metastable color centers exhibiting an absorption band at about 5750 Angstroms in the visible range and which is substantially free of impurity metals selected from the group consisting of iron, vanadium, tantalum, titanium and mixtures thereof.

4. A process for the production of a phototropic glass which comprises heating a glass composition consisting essentially of a glass base composition selected from the group consisting of soda-silica and soda-lime-silica glass compositions of high purity and containing cerium in an amount up to 25 percent by weight based on the weight of said glass base composition to a temperature above the melting point of said glass base composition in the substantial absence of oxygen and in the presence of carbon until said cerium is developed into cerous ($Ce^{+3}$) ion and then until a cooled portion of said heated molten glass composition contains a substantial quantity of incipient metastable color centers which exhibit an absorption band at about 5750 Angstroms in the visible range and thereupon immediately cooling said heated molten glass composition in the substantial absence of oxygen.

5. A process for the production of a phototropic glass which comprises heating a glass composition consisting essentially of a glass base composition selected from the group consisting of soda-silica and soda-lime-silica glass compositions and containing cerium in an amount up to 25 percent by weight based on the weight of said base glass composition, which is substantially free of impurity metals selected from the group consisting of iron, vanadium, tantalum, titanium and mixtures thereof to a temperature above the melting point of said glass base composition in the substantial absence of oxygen and in the presence of carbon until said cerium is developed into cerous ($Ce^{+3}$) ion and then until a cooled portion of said heated molten glass composition contains a substantial quantity of incipient metastable color centers which exhibit an absorption band at about 5750 Angstroms in the visible range and thereupon immediately cooling said heated molten glass composition in the substantial absence of oxygen.

References Cited by the Examiner

UNITED STATES PATENTS

| | | | |
|---|---|---|---|
| 1,536,919 | 5/1925 | Parkinson | 106—52 |
| 2,440,048 | 4/1948 | Hood | 106—52 |
| 2,684,911 | 7/1954 | Stookey | 106—52 |
| 2,862,131 | 11/1958 | Escher-Desriviers | 106—52 |
| 3,032,428 | 5/1962 | Ginther | 106—47 |
| 3,134,019 | 5/1964 | Bishay | 88—106 |

OTHER REFERENCES

Ginther et al.: "Glass Scintillators," I.R.E. Trans. Nuclear Sci.–NS–5, No. 3, Jan. 27–28, 1958, (pp. 92–95).

Bollinger et al.: "Glass Scintillators for Neutron Detection," Rev. Sci. Instr., vol. 30, No. 12, (1959), pp. 1135–1136.

Bishay: J. American Ceramic Society, April 1961, "Glass Scintillators for Neutron Detection," (pp. 231–233).

Cohen et al.: Science, Sept. 21, 1962 (pp. 981).

"Weyl-Coloured Glasses," pub. 1959, by Dawson's of Pall, London, chapter XXXI, and in particular pp. 504–506, 509–512.

TOBIAS E. LEVOW, *Primary Examiner.*

H. McCARTHY, *Assistant Examiner.*